(12) United States Patent
Lu

(10) Patent No.: US 8,871,353 B2
(45) Date of Patent: Oct. 28, 2014

(54) FILM COMPOSITION AND METHOD OF MAKING THE SAME

(75) Inventor: Pang-Chia Lu, Pittsford, NY (US)

(73) Assignee: Jindal Films Americas, LLC, Macedon, NY (US)

( * ) Notice: Subject to any disclaimer, the term of this patent is extended or adjusted under 35 U.S.C. 154(b) by 0 days.

(21) Appl. No.: 13/701,205

(22) PCT Filed: Jun. 6, 2011

(86) PCT No.: PCT/US2011/039274
§ 371 (c)(1),
(2), (4) Date: Jan. 31, 2013

(87) PCT Pub. No.: WO2012/015531
PCT Pub. Date: Feb. 2, 2012

(65) Prior Publication Data
US 2013/0164550 A1    Jun. 27, 2013

Related U.S. Application Data

(60) Provisional application No. 61/368,105, filed on Jul. 27, 2010.

(51) Int. Cl.
| | |
|---|---|
| *B32B 33/00* | (2006.01) |
| *B32B 27/00* | (2006.01) |
| *B32B 27/08* | (2006.01) |
| *C08L 23/08* | (2006.01) |
| *B32B 27/32* | (2006.01) |
| *B32B 27/20* | (2006.01) |

(52) U.S. Cl.
CPC ............. *C08L 23/0823* (2013.01); *B32B 27/32* (2013.01); *B32B 27/08* (2013.01); *B32B 27/20* (2013.01); *B32B 27/325* (2013.01); *B32B 27/327* (2013.01); *B32B 2250/242* (2013.01); *B32B 2250/40* (2013.01); *B32B 2270/00* (2013.01); *B32B 2274/00* (2013.01); *B32B 2307/736* (2013.01)
USPC ..... 428/484.1; 428/500; 428/515; 264/171.1; 264/173.11

(58) Field of Classification Search
None
See application file for complete search history.

(56) References Cited

U.S. PATENT DOCUMENTS

2008/0107899 A1 * 5/2008 Lu .................. 428/341
2009/0020898 A1    1/2009 Goerlitz et al.

FOREIGN PATENT DOCUMENTS

| EP | 1 842 645 | 10/2007 |
|---|---|---|
| WO | 2010/047906 | 4/2010 |

* cited by examiner

*Primary Examiner* — Sheeba Ahmed

(57) ABSTRACT

Films including at least one layer of a blend of a cyclic olefin copolymer and a hydrocarbon wax are described. Particularly, films including 75.0 wt % to 99.9 wt % of a copolymer of a cyclic olefin monomer and an acyclic olefin and 0.1 wt % to 25.0 wt % of a hydrocarbon wax are described. Methods of making such films are also disclosed.

23 Claims, No Drawings

FILM COMPOSITION AND METHOD OF MAKING THE SAME

PRIORITY CLAIM

This application is a National Stage Application of International Application No. PCT/US2011/039274, filed Jun. 6, 2011 which claims the benefit of prior U.S. provisional application Ser. No. 61/368,105 filed Jul. 27, 2010, both of which are hereby incorporated by reference in their entireties.

FIELD OF THE INVENTION

The invention relates to films including certain polymer blends and also to a process for preparation of such films. The polymer blends used in the films of the invention include a cyclic olefin copolymer and a hydrocarbon wax. In certain embodiments the films are suitable for shrink applications, particularly TD shrink applications.

BACKGROUND OF THE INVENTION

Generally, in the preparation of a film from granular or pelleted polymer resin, the polymer is first extruded to provide a stream of polymer melt, and then the extruded polymer is subjected to the film-making process. Film-making typically involves a number of discrete procedural stages including melt film formation, quenching, and windup. For a general description of these and other processes associated with film-making, see K. R. Osborn and W. A. Jenkins, Plastic Films: Technology and Packaging Applications, Technomic Publishing Co., Inc., Lancaster, Pa. (1992).

Orientation is accomplished by heating a polymer to a temperature at or above its glass transition temperature $T_g$, but below its crystalline melting point ($T_m$), and then stretching the film at a desirable rate. On cooling, the molecular alignment imposed by the stretching competes favorably with crystallization and the drawn polymer molecules condense into a crystalline network with crystalline domains (crystallites) aligned in the direction of the drawing force. Biaxial orientation is employed to more evenly distribute the strength qualities of the film in two directions. Biaxially oriented films tend to be stiffer and stronger, and also exhibit much better resistance to flexing or folding forces and tearing; leading to their greater utility in most packaging applications.

Oriented cyclic olefin copolymer films have a number of unique and useful properties. Processing of films including cyclic olefin copolymer on conventional industrial extrusion plants to make films; however, often produces a film having an undesirably high number of defects, such as gelling or fish eyes. Such defects can be reduced by the addition of a polyethylene to the cyclic olefin copolymer. But while including polyethylene reduces the number of defects, the resulting film has an undesirable level of haze. The presence of defects and/or haze limits the usefulness of the resulting films. There is therefore a need for cyclic olefin copolymer films that retain the particular properties imparted by the cyclic olefin copolymer yet have a reduced number of defects as well as low haze.

SUMMARY OF THE INVENTION

In one aspect, embodiments of the invention provide a film comprising at least a first layer, the first layer comprising 75 wt % to 99.9 wt % of a copolymer of a cyclic olefin monomer and an acyclic olefin; the copolymer having a glass transition temperature $T_g$, and 0.1 wt % to 25 wt % of a hydrocarbon wax.

In particular embodiments, the invention provides a film comprising a first layer, the first layer comprising 95 wt % to 99.9 wt % of a copolymer of a norbornene and ethylene; the copolymer having a glass transition temperature $T_g$, and 0.1 to 5 wt % of a hydrocarbon wax having a melting point (mp), such that mp equals $T_g \pm 20.0°$ C.

In another aspect, embodiments of the invention provide a multilayer film comprising a) a first layer comprising i) 75.0 wt % to 99.9 wt % of a copolymer of a cyclic olefin monomer and an acyclic olefin, the copolymer having a glass transition temperature $T_g$, and ii) 0.1 wt % to 25.0 wt % of a hydrocarbon wax; b) a second layer having a first surface and a second surface, wherein the first surface is in surface contact with the first layer; and c) a third layer in surface contact with the second surface of the second layer, the third layer comprising i) 75.0 wt % to 99.9 wt % of a copolymer of a cyclic olefin monomer and an acyclic olefin, the copolymer having a glass transition temperature $T_g$, and ii) 0.1 wt % to 25.0 wt % of a hydrocarbon wax. In particular embodiments, the second layer comprises a polypropylene homopolymer, or copolymer; a mini-random copolymer; a propylene-based elastomer; or combination thereof. The second layer optionally comprises a central core portion, an upper tie portion, and a lower tie portion; the upper tie portion including the first surface of the second layer and the lower tie portion including the second surface of the second layer. In some multilayer films, at least one of the upper tie portion or the lower tie portion comprises a polypropylene homopolymer or copolymer, a mini-random copolymer, a propylene-based elastomer, a copolymer of a cyclic olefin monomer, and an acyclic olefin, or combination thereof.

In some embodiments, the hydrocarbon wax has a viscosity of 80 to 120 SUS according to ASTM D-88 at 99° C., a penetration value of 5 to 10 dmm according to ASTM D-1321 at 25° C., and a melting point of 80 to 100° C. Particular hydrocarbon waxes are microcrystalline waxes.

In particular films, the first layer is substantially free of a polyethylene, e.g., the first layer comprises less than 2.0 wt % polyethylene.

Films, according to the invention, may have a reduced number of defects and/or reduced haze. For example, some films have a haze value of 1.0 or less according to ASTM D 1003. Some films have a defect number at least 70%, more particularly at least 90%; less than the defect number of a comparative film that lacks the hydrocarbon wax. In some films, the defect number of the film is at least 70% less than the defect number of a film that includes the same cyclic olefin copolymer resin and 2.5 wt % to 5 wt % polyethylene.

In another aspect, embodiments of the invention provide a method of making a film comprising a) combining 75.0 wt % to 99.9 wt % of a copolymer of a cyclic olefin monomer having 4 to 12 carbon atoms and an acyclic olefin with 0.1 wt % to 25.0 wt % of a hydrocarbon wax to form a blend; b) feeding the blend to an extruder; c) extruding the blend to form a first layer, optionally co-extruding the blend with at least one polymeric material to form a first layer of a multilayer film; and optionally orienting the film in at least one of MD, TD, or both.

DETAILED DESCRIPTION OF EMBODIMENTS OF THE INVENTION

The films of the present invention are derived from a combination of (A) a cyclic olefin copolymer or blend of two or more thereof and (B) at least one hydrocarbon wax. The films may be used as a monolayer film or as one or more layers of a multilayer film. In one embodiment, the films are clear, having a haze of <1.0, e.g., <0.8, or <0.5, according to ASTM D 1003.

Various specific embodiments, versions, and examples are described herein; including exemplary embodiments and definitions that are adopted for purposes of understanding the claimed invention. While the following detailed description gives specific preferred embodiments, those skilled in the art will appreciate that these embodiments are exemplary only and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

As used herein, "polymer" may be used to refer to homopolymers, copolymers, interpolymers, terpolymers, etc.

As used herein, unless specified otherwise, the term "copolymer(s)" refers to polymers formed by the polymerization of at least two different monomers. For example, the term "copolymer" includes the copolymerization reaction product of ethylene and an alpha-olefin (α-olefin), such as 1-hexene, or a cyclic olefin, e.g., norbornene. However, the term "copolymer" is also inclusive of, for example, the copolymerization of a mixture of ethylene, propylene, 1-hexene, and 1-octene.

As used herein, unless specified otherwise, the term "terpolymer(s)" refers to polymers formed by the polymerization of at least three distinct monomers.

As used herein, unless specified otherwise, the term "elastomer" refers to a polymer with the property of elasticity.

As used herein the term "mini-random propylene copolymer" refers to a polymer comprising 97.5 wt % to 99.5 wt % of polymer units derived from propylene monomer and 0.5 wt % to 2.5 wt % of polymer units derived from at least one other monomer, particularly an a-olefin, e.g., ethylene.

As used herein, weight percent (wt %), unless noted otherwise, means a percent by weight of a particular component based on the total weight of the mixture containing the component. For example, if a mixture or blend contains three grams of compound A and one gram of compound B, then the compound A comprises 75 wt % of the mixture and the compound B comprises 25 wt %.

The Cyclic Olefin Copolymer

The present invention relates to films prepared from a cyclic olefin copolymer or blend of two or more thereof. In one embodiment, the cyclic olefin copolymer is generally present in an amount from about 75.0 wt % to 99.9 wt %, based on the weight of the cyclic olefin copolymer and hydrocarbon wax in the monolayer or in the particular layer of a multilayer film including the cyclic olefin copolymer and hydrocarbon wax. In particular embodiments, the lower limit on the range of cyclic olefin copolymer is 80.0 wt %, 85.0 wt %, 90.0 wt %, 92.5 wt %, 97.5 wt %, 98.0 wt %, 99.0 wt %, or 99.5 wt %. The upper limit on the amount of cyclic olefin copolymer can be 80 wt %, 85 wt %, 90 wt %, 92.5 wt %, 97.5 wt %, 98.0 wt %, 99.0 wt %, 99.5 wt %, or 99.9 wt %. In a particular embodiment, the amount of cyclic olefin copolymer is about 95.0 wt % to about 99.9 wt %, or about 98.0 wt % to about 99.5 wt %, or about 98.5 wt % to about 99.25 wt %.

In some embodiments, the cyclic olefin copolymer includes, based on the total weight of the cyclic olefin copolymer, a) from 0.1 wt % to 99.9 wt %, 1.0 wt % to 99.0 wt %, or 2.0 wt % to 98.0 wt %, 5.0 wt % to 95.0 wt %, or 20.0 wt % to 90.0 wt %, of polymer units derived from at least one cyclic olefin of the following formulas I, II, III, IV, V, VI, or VII shown below:

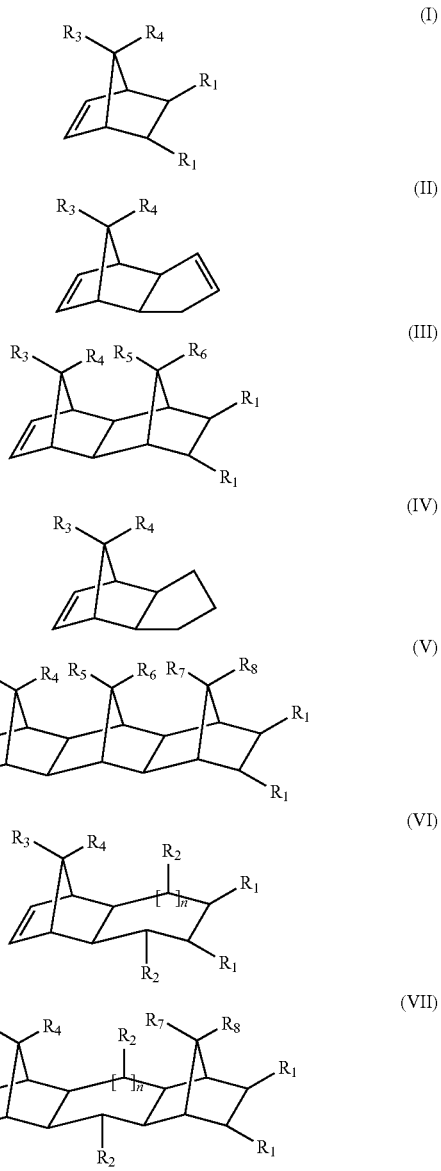

in which $R^1$, $R^2$, $R^3$, $R^4$, $R^5$, $R^6$, $R^7$, and $R^8$ are identical or different and each such $R^1$-$R^8$ group is selected from a hydrogen atom and $C_1$-$C_{20}$-hydrocarbyl, such as a linear or branched $C_1$-$C_8$-alkyl, $C_6$-$C_{18}$-aryl, $C_7$-$C_{20}$-alkylenearyl, or a cyclic or acyclic $C_2$-$C_{20}$-alkenyl groups. In particular embodiments, the two or more $R^1$-$R^8$ groups are condensed to form a saturated, unsaturated, or aromatic ring. $R^1$ to $R^8$ need not be the same in formulas I to VI and n can assume values from 0 to 5; and b) from 0.1 wt % to 99.9 wt %, preferably from 1.0 wt % to 99.0 wt %, or 2.0 wt % to 98.0 wt %, 5.0 wt % to 95.0 wt %, or 10.0 wt % to 80.0 wt %, based on the total weight of the cyclic olefin copolymer, of polymerized units which derive from one or more acyclic olefins of the formula VIII

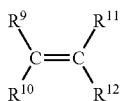

(VIII)

in which $R^9$, $R^{10}$, $R^{11}$, and $R^{12}$ are identical or different and each such $R^9$-$R^{12}$ group is selected from a hydrogen atom or a linear, branched, saturated, or unsaturated $C_1$-$C_{20}$-hydrocarbon group, such as a $C_1$-$C_8$-alkyl group, or a $C_6$-$C_{18}$-aryl group. In particular embodiments, the acyclic olefin component is selected from propylene, 1-butene, 1-hexene, 4-methyl-1-pentene, 1-octene, 1-decene, 1-dodecene, 1-tetradecene, 1-hexadecene, 1-octadecene, and 1-eicosene. In particular embodiments, the acyclic olefin is ethylene.

In one embodiment, the cyclic olefin copolymers used can contain from 0.1 wt % to 45 wt %, preferably from 0.1 wt % to 40 wt %, based on the total weight of the cyclic olefin copolymer, of polymerized units which derive from one or more monocyclic olefins of the formula IX:

(IX)

in which m is a number from 2 to 10.

The cyclic olefin units may also include derivatives of the cyclic olefins, such as those having polar groups; for example, halogen, hydroxy, ester, alkoxy, carboxy, cyano, amido, imido, or silyl groups.

For the purposes of the invention, preference is given to cyclic olefin copolymers which contain polymerized units which are derived from polycyclic olefins of the formula I or III and polymerized units which are derived from acyclic olefins of the formula VII. Particularly preferred are polycyclic olefins having underlying norbornene structure, e.g., norbornene and tetracyclododecene and, if appropriate, vinylnorbornene or norbornadiene.

Preference is also given to cyclic olefin copolymers having polymerized units derived from acyclic olefins having terminal double bonds, e.g., α-olefins having from 2 to 20 carbon atoms, in particular ethylene or propylene. Suitable cyclic olefin copolymer resins in these embodiments include, for example, ethylene-norbornene copolymers and ethylene-tetracyclododecene copolymers.

Preferred terpolymers may include ethylene-norbornene-vinylnorbornene terpolymers, ethylene-norbornene-norbornadiene terpolymers, ethylene-tetracyclododecene-vinylnorbornene terpolymers, ethylene-tetracyclododecene-vinyltetracyclododecene terpolymers, or ethylene-norbornene-dicyclopentadiene terpolymers.

A particularly preferred cyclic olefin copolymer for use in the invention is a copolymer composed of ethylene and norbornene.

The cyclic olefin copolymers can be prepared in a known manner at temperatures of from −78 to 200° C. and at a pressure of from 0.01 to 200 bar, in the presence of one or more catalyst systems in which at least one transition metal compound and, if appropriate, a cyclic olefin copolymercatalyst and a support material are present. Suitable transition metal compounds are metallocenes, in particular, stereorigid metallocenes. Examples of catalyst systems suitable for preparation of the cyclic olefin copolymers are described by way of example in U.S. Pat. No. 5,008,356; EP-A-0 407 870; EP-A-0 485 893; and EP-A-0 503 422.

Other routes briefly outlined below can also be used to prepare the cyclic olefin copolymers: catalyst systems based on mixed catalysts composed of titanium salts and of organylaluminum compounds are described in DD-A-109 224 and DD-A-237 070. EP-A-0 156 464 describes preparation using vanadium-based catalysts.

The cyclic olefin copolymers can also be obtained via ring-opening polymerization of at least one of the monomers having the formulas I to VI and subsequent hydrogenation of the products obtained.

The polymerization can also take place in a plurality of stages, and block copolymers can also be produced. See, for example, DE-A-42 05 416.

The heat resistance of the cyclic olefin copolymers can be adjusted widely. For cyclic olefin copolymers, the glass transition temperature $T_g$, is measured according to DIN EN ISO 11357-1, with the aid of DSC equipment at a heating rate of 20 K/min can be used as a guide to the heat resistance, which can be determined according to ISO 75 Part 1 and Part 2 of injection moldings. The glass transition temperatures of the cyclic olefin copolymers may be in a suitable range of from 25 to 200° C., preferably from 60 to 190° C., in particular from 65 to 145° C.

The density of the cyclic olefin copolymers used in the present invention is usually in the range of from 0.9 to 1.1 g/cm$^3$, preferably from 0.9 to 1.05 g/cm$^3$.

The viscosity numbers VN (measured according to DIN 53 728) of the cyclic olefin copolymers may be in the range from 5 to 5000 ml/g, preferably from to 2000 ml/g and in particular from 5 to 1000 ml/g.

The Hydrocarbon Wax

In addition to the cyclic olefin copolymer, the first skin layer preferably also includes a hydrocarbon wax. In contrast to typical polyethylene polymers, the addition of a hydrocarbon wax can provide a film that surprisingly provides fewer defects as well as low haze. The hydrocarbon wax may be either a mineral wax or a synthetic wax, paraffin waxes are particularly useful. In one embodiment, the wax is generally present in an amount from about 0.1 wt % to 25.0 wt %, based on the weight of the cyclic olefin copolymer and hydrocarbon wax in the monolayer or in the particular layer of a multilayer film including the cyclic olefin copolymer and hydrocarbon wax. In particular embodiments, the lower limit on the range of hydrocarbon wax is 20.0 wt %, 15.0 wt %, 10.0 wt %, 7.5 wt %, 2.5 wt %, 2.0 wt %, 1.0 wt %, or 0.5 wt %. The upper limit on the amount of hydrocarbon wax is 20.0 wt %, 15.0 wt %, 10.0 wt %, 7.5 wt %, 2.5 wt %, 2.0 wt %, 1.0 wt %, 0.5 wt %, or 0.1 wt %. In a particular embodiment, the amount of hydrocarbon wax is about 5.0 wt % to about 0.1 wt %, or less than about 2.0 wt % to about 0.5 wt %, or about 1.5 wt % to about 0.75 wt %.

Hydrocarbon waxes typically consist of a mixture of normal and branched paraffins, with the normal paraffin content preferably being from 35 to 90 percent by weight. The paraffin wax typically has a broad molecular weight distribution. Some suitable waxes have a molecular weight distribution wherein fractions of chains containing a certain number of carbon atoms preferably represents <25 wt %, more preferably <20 wt %, of the wax. The hydrocarbon wax preferably has an average chain length between 22 and 65 carbon atoms, particularly 22 to 40 carbon atoms; and/or a molecular weight (Mn) between about 300 and 800, particularly between 300 and 450. Suitable hydrocarbon waxes include microcrystalline waxes and intermediate waxes. Microcrystalline wax contains a high percentage of isoparaffin (branched) hydrocarbons and naphthenic hydrocarbons that form small and thin crystals during cooling. Without wishing to be held to any theory, it is believed that the presence of such crystals in the cyclic olefin copolymer film structure help reduce gels and reduce haze. Some such waxes are BARECO™ or BE SQUARE™ microcrystalline waxes (available from Baker Hughes). In some embodiments the hydrocarbon wax is a low molecular weight synthetic wax, e.g., polyethylene wax, is suitable.

Suitable hydrocarbon waxes have a melting point (mp) that is close to the glass transition temperature ($T_g$) of the cyclic olefin copolymer. In particular embodiments, the melting point of the hydrocarbon resin is within 20° C., 15° C., 10° C., or 5° C. of the $T_g$ of the cyclic olefin copolymer. Preferably, the hydrocarbon wax is one having a melting point that is greater than the glass transition temperature of the cyclic olefin copolymer. In particular embodiments, the hydrocarbon wax has a melting point such that $T_g \leq mp \leq T_g + 20°$ C., more particularly $T_g \leq mp \leq T_g + 15°$ C. In some embodiments, the melting point of the hydrocarbon wax has a value in the range $T_g \leq mp \leq T_g + 10°$ C. Alternatively, some suitable waxes have a melting point of from 50.0 to 100.0° C., or 80 to 100° C.

The hydrocarbon wax preferably has a viscosity of 80 to 120 SUS, 90 to 110 SUS or 95 to 105 SUS, according to ASTM D-88 at 99° C. and/or a penetration value of 5 to 15 dmm, particularly 5 to 10 dmm, according to ASTM D-1321 at 25° C.

Some films, including the cyclic olefin copolymer and the hydrocarbon wax, are substantially free of a polyethylene, e.g., less than 2.0 wt % polyethylene. Some such films have a haze value of 1.0 or less according to ASTM D 1003. Some such films have at least 70% fewer defects, particularly 90% fewer defects, than a film that includes the same cyclic olefin copolymer resin and 2.5 wt % to 5 wt % polyethylene. The number of defects (defect number) can be determined by an FS5 system from Optical Control Systems using a camera system in combination with suitable software. This permits comparison of defect numbers of inventive and comparative films.

Additives

One or more layers of the film may further contain one or more additives. Examples of useful additives include, but are not limited to, opacifying agents, pigments, colorants, cavitating agents, slip agents, antioxidants, anti-fog agents, anti-static agents, anti-block agents, moisture barrier additives, gas barrier additives, hydrocarbon resins, hydrocarbon waxes, fillers such as calcium carbonate, diatomaceous earth and carbon black, and combinations thereof. Such additives may be used in effective amounts, which vary depending upon the property required.

Examples of suitable opacifying agents, pigments, or colorants include, but are not limited to, iron oxide, carbon black, aluminum, titanium dioxide, calcium carbonate, poly terephthalate, talc, beta nucleating agents, and combinations thereof.

Cavitating agents or void-initiating particles may be added to one or more layers of the film to create an opaque film. Preferably, the cavitating agents or void-initiating particles are added to the core layer. Generally, the cavitating or void-initiating additive includes any suitable organic or inorganic material that is incompatible with the polymer material(s) contained in the layer(s) to which the cavitating or void-initiating additive is added, at the temperature of biaxial orientation. Examples of suitable void-initiating particles include, but are not limited to, polybutylene teraphthalate ("PBT"), nylon, cyclic-olefin copolymers, solid or hollow pre-formed glass spheres, metal beads or spheres, ceramic spheres, calcium carbonate, talc, chalk, or combinations thereof. The average diameter of the void-initiating particles typically ranges from about 0.1 μm to 10 μm. The particles may be of any desired shape or, preferably, they are substantially spherical in shape. Preferably, the cavitating agents or void-initiating particles are present in the layer at less than 30 wt %, or less than 20 wt %, or most preferably in the range of 2 wt % to 10 wt %, based on the total weight of the layer. Alternatively, one or more layers of the film may be cavitated by beta nucleation, which includes creating beta-form crystals of polypropylene and converting at least some of the beta-crystals to alpha-form crystals thus leaving small voids remaining after the conversion.

Slip agents that may be used, include, but are not limited to, higher aliphatic acid amides, higher aliphatic acid esters, waxes, silicone oils, and metal soaps. Such slip agents may be used in amounts in the range of 0.1 wt % to 2 wt % based on the total weight of the layer to which it is added. An example of a fatty acid slip additive that may be used is erucamide. In one embodiment, a conventional polydialkylsiloxane, such as silicone oil or silicone gum, additive having a viscosity of 10,000 to 2,000,000 cSt is used.

Non-migratory slip agents may be used in one or more of the outer surface layers of the films. Non-migratory means that these agents do not generally change location throughout the layers of the film in the manner of migratory slip agents. A preferred non-migratory slip agent is polymethyl methacrylate ("PMMA"). The non-migratory slip agent may have a mean particle size in the range of 0.5 μm to 15 μm, or 1 μm to 10 μm, or 1 μm to 5 μm, or 2 μm to 4 μm, depending on the layer's thickness and desired slip properties. Alternatively, the size of the particles in the non-migratory slip agent, such as PMMA, may be greater than 10% of the thickness of the surface layer containing the slip agent, or greater than 20% of the layer's thickness, or greater than 50% of the layer's thickness, or in some embodiments greater than 100% of the layer's thickness. Generally spherical, particulate non-migratory slip agents are contemplated. A commercially available example of a PMMA resins is EPOSTAR™ which is available from Nippon Shokubai Co., Ltd. of Japan.

An example of a suitable antioxidant includes phenolic anti-oxidants, such as IRGANOX® 1010, which is commercially available from Ciba-Geigy Company of Switzerland. Such an antioxidant may be used in an amount ranging from 0.1 wt % to 2 wt %, based on the total weight of the layer to which it is added.

Anti-static agents, that may be used, include alkali metal sulfonates, polyether-modified polydiorganosiloxanes, polyalkylpheylsiloxanes, tertiary amines, and glycerol mono-stearate, blends of glycerol mono-stearate and tertiary amines, and combinations thereof. Such anti-static agents may be used in amounts in the range of about 0.05 wt % to 3 wt %, based on the total weight of the layer to which the anti-static is added. An example of a suitable anti-static agent is ARMOSTAT™ 475, commercially available from Akzo Nobel.

Useful antiblock additives include, but are not limited to, silica-based products such as inorganic particulates such as silicon dioxide, calcium carbonate, magnesium silicate, aluminum silicate, calcium phosphate, and the like. Other useful antiblock additives include polysiloxanes and non-meltable crosslinked silicone resin powder, such as TOSPEARL™, which is commercially available from Toshiba Silicone Co., Ltd. Anti-blocking agents may be effective in amounts up to about 30,000 ppm of the layer to which it is added.

Examples of useful fillers include, but are not limited to, finely divided inorganic solid materials such as silica, fumed silica, diatomaceous earth, calcium carbonate, calcium silicate, aluminum silicate, kaolin, talc, bentonite, clay, and pulp.

Film Structures

The films described herein may be used alone as a monolayer film or in combination with other films to make a multilayer film construction. Multilayer films include at least one of the layers according to an embodiment of the invention. In particular embodiments, multilayer films include at least one skin layer according to an embodiment of the invention.

The thickness of the films will range from about 0.5 mils (12.5 microns) to about 10 mils (250 microns) depending upon the anticipated utility of the film. More often, however, the films of the present invention will have a thickness of less than 7 mils (178 microns). Film thicknesses of from about 1 to about 6 mils (25 to 150 microns), more often from about 1 to about 4 mils (25 to 100 microns) and most often from about 1.5 to about 2.5 mils (37.5 to 62.5 microns) are particularly useful.

Particular multilayer film structures relate to three-layer films. Three layer films may be considered to have an A/B/C layer structure, wherein Layer A is a layer according to an embodiment of the invention. In some embodiments, Layer C is also a layer according to an embodiment of the invention, preferably, but not necessarily, of a composition substantially the same as that of A. In other embodiments, C is a polypropylene homopolymer or copolymer, a mini-random propylene copolymer, or a terpolymer, e.g., an ethylene-propylene-butylene terpolymer. Layer B may be a core layer comprising a suitable core layer composition, e.g., a polypropylene homopolymer or copolymer, a mini-random propylene copolymer, or polyethylene homopolymer or copolymer, e.g., HDPE. In particular embodiments, Layer B comprises 50.0 wt % to 100 wt % of a propylene-based homopolymer or copolymer and 0 wt % to 50.0 wt % of a propylene-based elastomer. In particular embodiments, the Layer B comprises 30.0 wt % to 50.0 wt %, particularly 35.0 wt % to 45.0 wt %, of the propylene-based elastomer and 50 wt % to 70 wt %, particularly 55.0 wt % to 65.0 wt %, of a propylene-ethylene copolymer, preferably having <10 wt %, more particularly <5 wt %, polymer units derived from ethylene. Particularly suitable propylene-ethylene copolymers include HB8573 (available from Total Petrochemicals). Particularly suitable propylene-based elastomers include VISTAMAXX™ propylene based elastomers (available from ExxonMobil Chemical Company).

In other embodiments, the multilayer film structures can be considered to have a five-layer A/D/B/E/C structure. Layers A, B, and C can be as described in the previous paragraph. Layers D and E may be considered tie-layers located between layers A and B and Layers B and C, respectively. Layers D and E may be of the same or different composition and may be of the same or different composition as Layer B. While layers D and E are distinct layers, they may be conceptually also considered part of layer B. In particular embodiments, Layers D and E independently comprise 30.0 wt % to 50.0 wt %, particularly 35.0 wt % to 45.0 wt %, of a propylene-based elastomer and 50 wt % to 70 wt %, particularly 55.0 wt % to 65.0 wt %, of a propylene-ethylene copolymer, e.g., HB8573; while Layer B comprises 60.0 wt % to 100.0 wt %, particularly 70.0 wt % to 90.0 wt % of a propylene-based elastomer and 0.0 wt % to 40.0 wt %, particularly, 10.0 wt % to 30.0 wt % of a propylene-ethylene copolymer.

Methods of Making Films

Embodiments of the invention include methods of making a film. Such methods include combining 75.0 wt % to 99.9 wt % of a copolymer of a cyclic olefin monomer, preferably having 4 to 12 carbon atoms, and an acyclic olefin with 0.1 wt % to 25.0 wt % of a hydrocarbon wax to form a blend. Combining the copolymer and the hydrocarbon wax may be accomplished by any suitable method, e.g., dry blending, solvent blending, or reactor blending. The blend is then fed to an extruder where it is extruded to form a first layer of a film, optionally co-extruding the blend with at least one polymeric material to form a first layer of a multilayer film. The film is optionally oriented in at least one of MD, TD, or both.

Preferably, films made in this manner have a haze value of 1.0 or less according to ASTM D 1003.

One method of carrying out such a method involves cast extrusion of a sheet of polymer (typically 500 μm to 650 μm thick) followed by orientation, either in the machine direction, the transverse direction, or both at elevated temperature on a stretching apparatus. Preferably, the stretching profile offers even stretching, without unacceptable stretch bands, breakage or sagging over a wide range of stretching temperatures. A typical commercial tenter frame process to make biaxially oriented polypropylene film, operating at 250 m/min. line speed and with TD stretch ratio 850% (i.e., 1 m wide film stretched to 8.5 m), has a TD-stretch strain rate of about 15,000% per minute.

Density is measured at room temperature per the ASTM D-1505 test method.

Melt index of ethylene-based polymers is determined according to ASTM D-1238 using a 2.16 kg load at 190° C.

Melt Flow Rate (MRF) of propylene-based polymers is determined according to ASTM D-1238 using a 2.16 kg load at 230° C.

Heat shrinkage values are reported as the percent shrinkage in the MD and TD direction after the film is exposed to a 95° C. water bath for 10 seconds.

The haze (%) is measured in accordance with ASTM D1003.

EXAMPLES

Comparative Example 1

Comparative Example 1 comprises a three-layer film wherein Layer A comprises a cyclic olefin copolymer, Topas 8007F-400, available from Topas Advanced Polymers (COC#1); Layer B is designed to simulate a tie layer and comprises the same Topas 8007F-04 cyclic olefin copolymer; and Layer C is a blend of 80.0 wt % propylene-based elastomer, VISTAMAXX™ 3980, and 20.0 wt % propylene-ethylene copolymer, HB8573. The layers were formed into a film by coextrusion and casting onto a polished casting roll followed by biaxial orientation. The resultant film had a low level of defects (i.e., gels) but a relatively high haze.

Comparative Example 2

Comparative Example 2 is substantially the same as Comparative Example 1, except that the cyclic olefin copolymer in Layers A and B is replaced with Topas 8007F-04 (COC#2). This film showed low haze but relatively high number of gel defects.

Comparative Example 3

Comparative Example 3 is substantially the same as Comparative Example 2, except that Layers A and B comprise 94.0 wt % COC#2 and 6.0 wt % of a polyethylene copolymer having a melt index of 5.0 (ASTM D-1238, 2.16 kg/190° C.)

and a density of 0.870 g/cc³ (available from ExxonMobil Chemical Company as EXACT™ 5371). The film had a low level of defects (i.e., gels) but a relatively high haze.

Comparative Example 4

Comparative Example 4 is substantially the same as Comparative Example 2, except that the Layer B comprises 60.0 wt % of the propylene-ethylene copolymer HB8573 and 40.0 wt % of the propylene-based elastomer VISTAMAXX™ 3980. The film is oriented in the transverse direction. Layer C comprises 60.0% HB8573 and 40.0% propylene-based elastomer VISTAMAXX™ 3980.

Comparative Example 5

The film of Comparative Example 7 is prepared in substantially the same manner as Comparative Example 1, except that Layer B comprises 60.0 wt % of the propylene-ethylene copolymer HB8573 and 40.0 wt % of the propylene-based elastomer VISTAMAXX™ 3980. The film was produced using a matte caster roll rather than a polished roll.

Comparative Example 6

The film of Comparative Example 8 is prepared in substantially the same manner as Comparative Example 4, except that the film was produced using a matte caster roll rather than a polished roll. Layer C comprises 40.0 wt % propylene-based elastomer VISTAMAXX™ 3980 and 60.0 wt % propylene-ethylene copolymer HB8573.

Example 1

Example 1 is substantially the same as Comparative Example 4, except that Layer A comprises 99.0 wt % of COC#2 and 1.0 wt % of a microcrystalline hydrocarbon wax having a melting point of 92° C. (ASTM D-127), a needle penetration value of 8 dmm (ASTM D-1321 at 25° C.), and a viscosity of 90 SUS (ASTM D-88 at 99° C.).

The film structure and related data are summarized in Table 1.

The data shows that none of the films of cyclic olefin copolymers are able to provide a film having both a low haze and reduced gel formation. While combinations where cyclic olefin copolymer is combined with a high molecular weight polyethylene may provide films with reduced defects (i.e., gels); they still suffer from haze. Example 1, however, shows that when a film comprising a cyclic olefin copolymer and a hydrocarbon wax is formed into a film, the films have both reduced defects and very low haze.

The foregoing examples have been provided merely for the purpose of explanation and are in no way to be construed as limiting of this disclosure. While the invention has been described with respect to a limited number of embodiments, the specific features of one embodiment should not be attributed to other embodiments of the invention. No single embodiment is representative of all aspects of the invention. Moreover, variations and modifications therefrom exist. For example, in some embodiments the hydrocarbon wax is a synthetic wax other than polyethylene or an amide, e.g., bis-stearoyl-ethylenediamine. Thus, embodiments may be substantially free of polyethylene and/or amide waxes. Various additives may also be used to further enhance one or more properties. In other embodiments, the composition consists essentially of, or consists of, the enumerated components described herein. In some embodiments, the composition is substantially free of any additive not specifically enumerated herein. The appended claims intend to cover all such variations and modifications as falling within the scope of the invention.

What is claimed is:

1. An oriented film comprising at least a first layer and a core layer comprising a polypropylene homopolymer or copolymer, the first layer comprising:
   a) 75.0 wt % to 99.9 wt % of a copolymer of a cyclic olefin monomer and an acyclic olefin, the copolymer having a glass transition temperature, $T_g$; and
   b) 0.1 wt % to 25.0 wt % of a hydrocarbon wax;
   wherein $T_g$ is ≤ the melting point (mp) of the hydrocarbon wax;

TABLE 1

Film Composition and Properties

| Example | Layer A (skin) | Layer B (tie) | Layer C (core) | Casting Roll Surface Finish | Gauge (mil) | Haze | Heat Shrinkage (% Change) MD | Heat Shrinkage (% Change) TD | Gels |
|---|---|---|---|---|---|---|---|---|---|
| CE1 (wt %) | COC#1 (100.0) | COC#1 (100.0) | PP-Elastomer (80.0) PE Copolymer (20.0) | polished | 2.1 | 18.0 | 4.6 | −70 | no |
| CE2 (wt %) | COC#2 (100.0) | COC#2 (100.0) | PP-Elastomer (80.0) PE Copolymer (20.0) | polished | 2.0 | 1.5 | 8.3 | −66.0 | yes |
| CE3 (wt %) | COC#2 (94.0) Exact 5371 (6.0) | COC#2 (94.0) Exact 5371 (6.0) | PP-Elastomer (80.0) PE Copolymer (20.0) | polished | 2.0 | 8.3 | 8.3 | −63 | yes |
| CE4 (wt %) | COC#2 (100.0) | PP Elastomer (40.0) PE Copolymer (60.0) | PP Elastomer (40.0) PE Copolymer (60.0) | polished | 2.0 | 1.1 | 0 | −37 | yes |
| CE5 (wt %) | COC#1 (100.0) | COC#1 (100.0) | PP-Elastomer (80.0) PE Copolymer (20.0) | matte | 2.0 | 8.9 | 7.3 | −67.0 | no |
| CE6 (wt %) | COC#2 (100.0) | PP Elastomer (40.0) PE Copolymer (60.0) | VISTAMAXX ™ 3980 (40.0) HB8573 (60.0) | matte | 2.0 | 1.5 | 0 | −37.0 | yes |
| Ex. 1 (wt %) | COC#2 (99.0) Wax (1.0) | PP Elastomer (40.0) PE Copolymer (60.0) | PP-Elastomer (40.0) PE Copolymer (60.0) | matte | 2.0 | 0.5 | 0 | −37.0 | no | wherein the first layer comprises less than 2.0 wt % polyethylene and has a haze value of 1.0 % or less according to ASTM D 1003;
wherein the oriented, polypropylene film is non-metallized.

2. The film of claim 1, wherein $T_g \leq mp \leq T_g + 20.0°$ C.

3. The film of claim 1, wherein $T_g \leq mp \leq T_g + 10.0°$ C.

4. The film of claim 1, wherein the cyclic olefin monomer has 4 to 12 carbon atoms.

5. The film of claim 1, wherein cyclic olefin monomer is a norbornene.

6. The film of claim 1, wherein the acyclic olefin is selected from a group consisting of ethylene, propylene, butylene, and mixtures thereof.

7. The film of claim 1, wherein hydrocarbon wax is a microcrystalline wax.

8. The film of claim 1, wherein the first layer comprises less than 2.0 wt % to about 0.5 wt % of the hydrocarbon wax.

9. The film of claim 1, wherein the first layer is substantially free of a polyethylene.

10. The film according to claim 1, wherein the defect number of the film is at least 70% less than the defect number of a comparative film that lacks the hydrocarbon wax.

11. The film according to claim 1, wherein the defect number of the film is at least 90% less than the defect number of a comparative film that lacks the hydrocarbon wax.

12. The film according to claim 1, wherein the defect number of the film is at least 70% less than the defect number of a film that includes the same cyclic olefin copolymer resin and 2.5 wt % to 5 wt % polyethylene.

13. The film of according to claim 1, wherein the hydrocarbon wax has a viscosity of 80 to 120 SUS according to ASTM D-88 at 99° C., a penetration value of 5 to 10 dmm according to ASTM D-1321 at 25° C., and a melting point of 80 to 100° C.

14. An oriented film comprising at least a first layer and a core layer comprising a polypropylene homopolymer or copolymer, the first layer, comprising:
  a) 95 wt % to 99.9 wt % of a copolymer of a norbornene and ethylene, the copolymer having a glass transition temperature, $T_g$; and
  b) 0.1 wt % to 5 wt % of a hydrocarbon wax having a melting point (mp), wherein the mp is within 20° C. of the $T_g$;
wherein the first layer comprises less than 2.0 wt % polyethylene and has a haze value of 1.0% or less according to ASTM D 1003;
wherein the film is non-metallized.

15. The film of claim 14, wherein $T_g \leq mp \leq T_g + 20.0°$ C.

16. The film of any of claim 14, further comprising a second layer having an upper surface and a lower surface, wherein the upper surface of the second layer is in surface contact with a lower surface of the first layer.

17. The film of claim 16, wherein the second layer is a tie layer or a core layer.

18. The film of claim 16, wherein the second layer comprises 50.0 wt % to 100 wt % of a propylene-based homopolymer or copolymer and 0 wt % to 50.0 wt % of a propylene-based elastomer.

19. The film of claim 14, wherein the hydrocarbon wax is a microcrystalline wax.

20. The film of claim 14, wherein the hydrocarbon wax has a viscosity of 80.0 to 120.0 SUS according to ASTM D-88 at 99° C.

21. The film of claim 14, wherein the hydrocarbon wax has a penetration value of 5 to 10 dmm according to ASTM D-1321 at 25° C.

22. A method of making a non-metallized, multilayer film comprising:
  a) combining 75.0 wt % to 99.9 wt % of a copolymer of a cyclic olefin monomer having 4 to 12 carbon atoms and an acyclic olefin with 0.1 wt % to 25.0 wt % of a hydrocarbon wax to form a blend;
  b) feeding the blend to an extruder;
  c) co-extruding the blend with at least a polypropylene material for form a first layer of the non-metallized, multilayer film, wherein the first layer is substantially free of a polyethylene; and
  d) orienting the non-metallized, multilayer film in at least one of MD, TD, or both, the non-metallized, multilayer film having a haze value of 1.0 or less according to ASTM D 1003.

23. An oriented, non-metallized, multi-layer film comprising:
  a) a first layer comprising:
    i) 75.0 wt % to 99.9 wt % of a copolymer of a cyclic olefin monomer and an acyclic olefin, the copolymer having a glass transition temperature, $T_g$; and
    ii) 0.1 wt % to 25.0 wt % of a hydrocarbon wax having an average chain length between 22 and 65 carbon atoms;
  b) a second polypropylene layer having a first surface and a second surface, wherein the first surface is in surface contact with the first layer; and
  c) a third layer in surface contact with the second surface of the second layer, the third layer comprising:
    i) 75.0 wt % to 99.9 wt % of a copolymer of a cyclic olefin monomer and an acyclic olefin, the copolymer having a glass transition temperature, $T_g$; and
    ii) 0.1 to 25.0 wt % of a hydrocarbon wax; and
  wherein the first layer comprises less than 2.0 wt % polyethylene and has a haze value of 1.0% or less according to ASTM D 1003 for the non-metallized, multi-layer film.

* * * * *